(12) United States Patent
Wang et al.

(10) Patent No.: US 10,176,169 B2
(45) Date of Patent: Jan. 8, 2019

(54) METHOD AND SYSTEM FOR PROVIDING TRANSLATION INFORMATION

(71) Applicant: BAIDU ONLINE NETWORK TECHNOLOGY (BEIJING) CO., LTD., Beijing (CN)

(72) Inventors: Fan Wang, Beijing (CN); Wei He, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/322,515

(22) PCT Filed: Jul. 13, 2015

(86) PCT No.: PCT/CN2015/083902
§ 371 (c)(1),
(2) Date: Dec. 28, 2016

(87) PCT Pub. No.: WO2016/155144
PCT Pub. Date: Oct. 6, 2016

(65) Prior Publication Data
US 2017/0139906 A1  May 18, 2017

(30) Foreign Application Priority Data
Mar. 27, 2015  (CN) .......................... 2015 1 0142606

(51) Int. Cl.
*G06F 17/28* (2006.01)
*G06F 3/0482* (2013.01)

(52) U.S. Cl.
CPC ........ *G06F 17/2836* (2013.01); *G06F 3/0482* (2013.01); *G06F 17/289* (2013.01); *G06F 17/2854* (2013.01); *G06F 17/2863* (2013.01)

(58) Field of Classification Search
CPC .... G06F 17/289; G06F 17/2854; G06F 17/28; G06F 17/2836; G10L 17/22
See application file for complete search history.

(56) References Cited

U.S. PATENT DOCUMENTS

2005/0021323 A1* 1/2005 Li ....................... G06F 17/2735
704/5
2005/0049881 A1* 3/2005 Xun ....................... G06F 17/271
704/277

(Continued)

FOREIGN PATENT DOCUMENTS

CN  1426561 A  6/2003
CN  101266600 A  9/2008

(Continued)

OTHER PUBLICATIONS

Korean Patent Application No. 2016-7031835, Office Action dated Nov. 20, 2017.

(Continued)

*Primary Examiner* — Olujimi Adesanya
(74) *Attorney, Agent, or Firm* — Lathrop Gage LLP

(57) ABSTRACT

A method and system for providing translation information are disclosed. The method for providing translation information includes: S1, receiving a source language statement inputted by a user, and acquiring a current target language statement according to the source language statement; S2, displaying the current target language statement and a preset control on a current interface; and S3, receiving an operation performed on the preset control from the user, and acquiring another target language statement according to the operation and displaying the other target language statement on the current interface. With the method, many translation results of one complete statement may be provided fast and conveniently without repeatedly selecting words or phrases from several candidate items, such that the user may view (Continued)

more translation results, thus improving the accuracy of translation and the user satisfaction level effectively.

9 Claims, 5 Drawing Sheets

(56) References Cited

U.S. PATENT DOCUMENTS

| | | | | |
|---|---|---|---|---|
| 2006/0004560 | A1* | 1/2006 | Whitelock | G06F 17/2827 704/2 |
| 2007/0203688 | A1* | 8/2007 | Fuji | G06F 17/28 704/2 |
| 2012/0123765 | A1* | 5/2012 | Estelle | G06F 17/277 704/3 |
| 2013/0144594 | A1* | 6/2013 | Bangalore | G06F 17/2836 704/2 |
| 2014/0207439 | A1* | 7/2014 | Venkatapathy | G06F 17/2836 704/4 |
| 2014/0288913 | A1* | 9/2014 | Shen | G06F 17/289 704/2 |
| 2015/0161115 | A1* | 6/2015 | Cuthbert | G06F 17/2735 704/2 |
| 2015/0286634 | A1* | 10/2015 | Shin | G06F 17/289 704/2 |

FOREIGN PATENT DOCUMENTS

| | | |
|---|---|---|
| CN | 101320366 A | 12/2008 |
| CN | 101322097 A | 12/2008 |
| CN | 101763403 A | 6/2010 |
| CN | 101937431 A | 1/2011 |
| CN | 102467498 A | 5/2012 |
| CN | 103577394 A | 2/2014 |
| CN | 104731776 A | 6/2015 |
| EP | 2261818 A1 | 12/2010 |
| JP | S63136266 A | 6/1988 |
| JP | H096786 A | 1/1997 |
| JP | 2003532194 A | 10/2003 |
| JP | 2005141490 A | 6/2005 |
| WO | WO 0182111 A2 | 11/2001 |
| WO | WO 0182119 A2 | 11/2001 |

OTHER PUBLICATIONS

Korean Patent Application No. 2016-7031835, English translation of Office Action dated Nov. 20, 2017.
European Patent Application 15887111.1 extended Search and Opinion dated Feb. 8, 2018, 10 pages.
PCT/CN2015/083902 English Translation of the International Search Report, 2 pages.
Chinese Patent Application No. 201510142606.3 First Office Action dated Feb. 27, 2017 with English translation, 12 pages.
Japanese Patent Application 2017535674 Office Action dated Jul. 24, 2018, 4 pages.
Japanese Patent Application 2017535674 English translation of Office Action dated Jul. 24, 2018, 3 pages.

* cited by examiner

METHOD AND SYSTEM FOR PROVIDING TRANSLATION INFORMATION

CROSS-REFERENCE TO RELATED APPLICATION

This application is a U.S. national phase of International Application No. PCT/CN2015/083902, which claims priority of Chinese Patent Application Serial No. 201510142606.3, entitled "method and system for providing translation information", filed with the State Intellectual Property Office of P. R. China on Mar. 27, 2015, by Baidu online network technology (Beijing) CO., LTD., the entire content of which is incorporated herein by reference.

FIELD

The present disclosure relates to a field of translation technology, and more particularly to a method and a system for providing translation information.

BACKGROUND

An existing translation system only displays one translation result for a same source language statement (i.e., text required to be translated) by default. With the method of providing only one translation result, the accuracy of translation would be reduced.

In order to solve the problem that the translation result is single, the existing system provides a mechanism of displaying many candidate translation results. In this way, when the user is unsatisfied with the current translation result, he/she may select other candidate translation result on the word or phrase level. For example, the user may click the corresponding word or phrase in the Google Translation System shown in FIG. 1, and select words from the candidate items, so as to acquire other translation result.

Although many existing translation systems provide the mechanism of displaying many candidate translation results, it is hard for those unfamiliar with the translation technique to determine which one of the candidate items is better and to make an appropriate choice if there are candidate items for some words or phrases in one sentence. At the same time, with this method, the user should select the candidate results one by one, and the translation result for the complete sentence is not provided conveniently. In addition, the function of displaying many candidate results is not obvious for the user, the user needs to click the corresponding word or phrase by himself/herself, and then several candidate results corresponding to the word or phrase may be provided. Further, since the displaying screen of the mobile phone is small, it is not suitable to display too many candidate results.

SUMMARY

Embodiments of the present disclosure provide a method for providing translation information, including: S1, receiving a source language statement inputted by a user, and acquiring a current target language statement according to the source language statement; S2, displaying the current target language statement and a preset control on a current interface; and S3, receiving an operation performed on the preset control from the user, and acquiring another target language statement according to the operation and displaying the other target language statement on the current interface.

Embodiments of the present disclosure provide a system for providing translation information. The system includes: a first acquiring module, configured to receive a source language statement inputted by a user, and to acquire a current target language statement according to the source language statement; a displaying module, configured to display the current target language statement and a preset control on a current interface; and a switching and displaying module, configured to receive an operation performed on the preset control from the user, to acquire another target language statement according to the operation and to display the other target language statement on the current interface.

Embodiments of the present disclosure provide a storage medium for storing an application program which is configured to execute: S1, receiving a source language statement inputted by a user, and acquiring a current target language statement according to the source language statement; S2, displaying the current target language statement and a preset control on a current interface; and S3, receiving an operation performed on the preset control from the user, and acquiring another target language statement according to the operation and displaying the other target language statement on the current interface.

Embodiments of the present disclosure provide a device for providing translation information, including: one or more processors; a memory; one or more modules stored in the memory, when executed by the one or more processors, performing: S1, receiving a source language statement inputted by a user, and acquiring a current target language statement according to the source language statement; S2, displaying the current target language statement and a preset control on a current interface; and S3, receiving an operation performed on the preset control from the user, and acquiring another target language statement according to the operation and displaying the other target language statement on the current interface.

DETAILED DESCRIPTION

Figure 1:
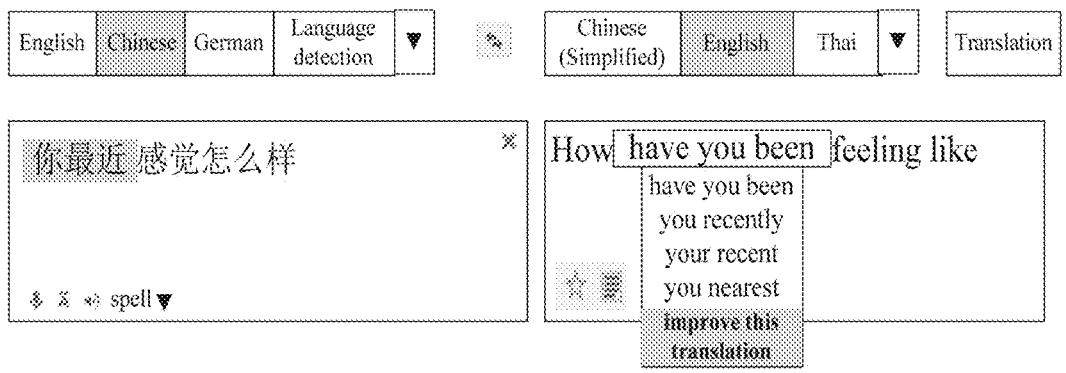
FIG. 1 is a schematic diagram showing many candidate results provided by the Google Translation System in the related art.

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

The method and system for providing translation information according to embodiments of the present disclosure will be described with reference to drawings.

Figure 2:
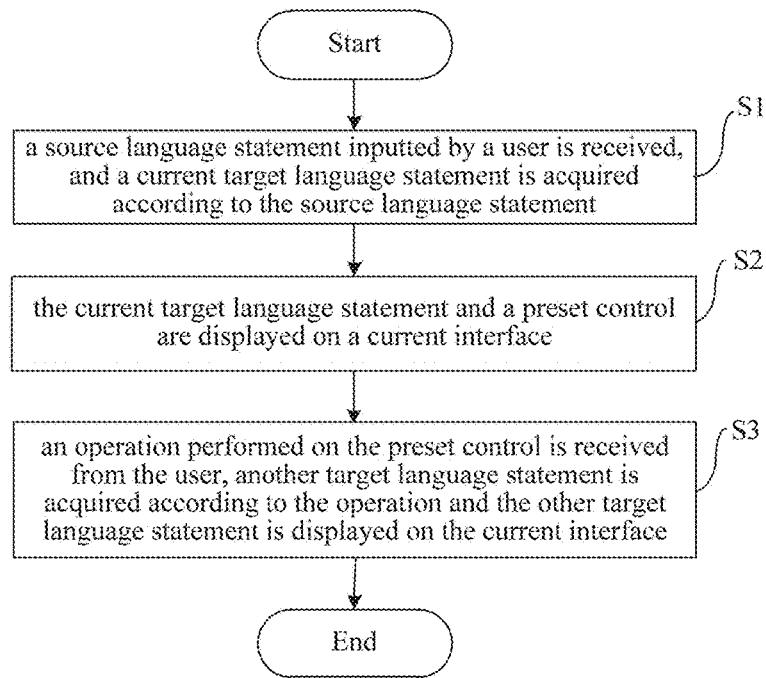
FIG. 2 is a flow chart of a method for providing translation information according to an embodiment of the present disclosure.

FIG. 2 is a flow chart of a method for providing translation information according to an embodiment of the present disclosure.

As shown in FIG. 2, the method includes followings.

S1, a source language statement inputted by a user is received, and a current target language statement is acquired according to the source language statement.

In this embodiment, the translation system may receive the source language statement inputted by the user on the translation interface, and acquire the corresponding target language statement according to the source language statement inputted by the user. In order to distinguish from other target language statements, the target language statement acquired here may refer to "the current target language statement".

For example, the source language statement may be "你最近感觉怎么样". The current target language statement may be "How do you feel about the recent".

In addition, in this embodiment, the method may further include: acquiring a target language statement collection associated with the current target language statement, in which the target language statement collection includes target language statements sequenced in an order from high to low according to confidence levels.

For example, the target language statement collection associated with the current target language statement "How do you feel about the recent" may include the target language statements, such as, "How do you feel about recently", "What do you feel about the recent", "How do you feel the recent", "How do you like the recent" or other target language statements stored therein, and confidence levels of these target language statements are sequenced in an order from high to low.

S2, the current target language statement and a preset control are displayed on a current interface.

In this embodiment, after acquiring the current target language statement, the current target language statement may be displayed on the corresponding translation interface. Additionally, except the current target language statement, the preset control may be displayed on the translation interface. The preset control includes but is not limited to a button.

Specifically, the preset control may include a first button and a second button. The first button may be configured to view the next translation result, i.e., view the next target language statement. The second button may be configured to view the last translation result, i.e., view the last target language statement.

In addition, in order to facilitate to distinguish functions of the two buttons, the buttons may be indicated by preset icons. For example, the button "view the next translation result" may be indicated by ">", and the button "view the last translation result" may be indicated by "<".

S3, an operation performed on the preset control is received from the user, another target language statement is acquired according to the operation and the other target language statement is displayed on the current interface.

If the preset control includes the first button and the second button, receiving an operation performed on the present control from the user and acquiring another target language statement according to the operations may include: receiving a trigger operation performed on the first button from the user and acquiring a next target language statement from the target language statement collection according to the trigger operation and the current target language statement displayed on the current interface; or may include: receiving a trigger operation performed on the second button from the user and acquiring a last target language statement from the target language statement collection according to the trigger operation and the current target language statement displayed on the current interface.

Figure 3:
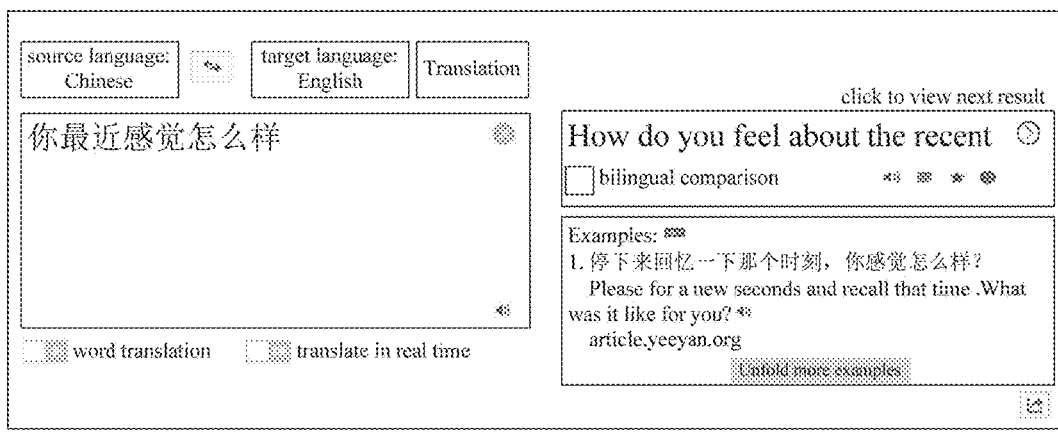
FIG. 3 is a first schematic diagram showing a translation interface according to an embodiment of the present disclosure.
Figure 4:
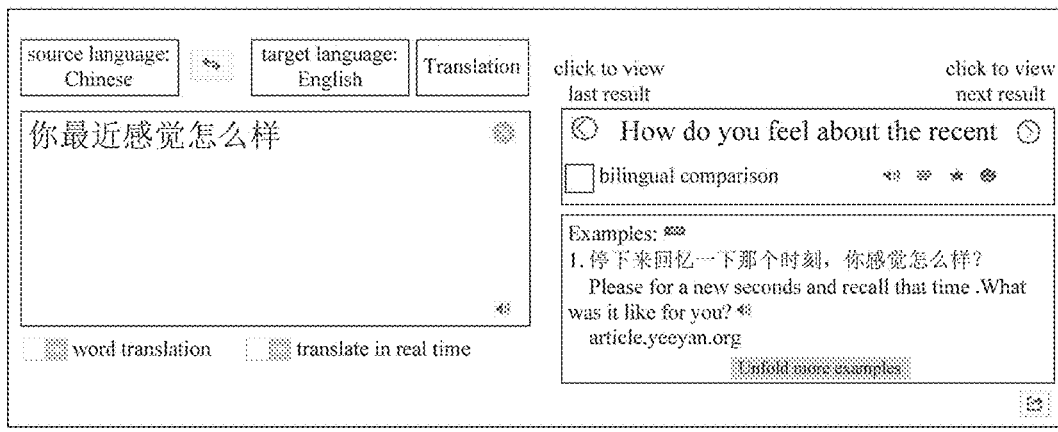
FIG. 4 is a second schematic diagram showing a translation interface according to an embodiment of the present disclosure.

For example, the first button, i.e., the button "view the next translation result" is displayed on the translation interface shown in FIG. 3, and the user may view more translation results after clicking this button. Additionally, as shown in FIG. 4, the second button, i.e., the button "view the last translation result" may be displayed on the translation interface, and the user may click this button and return to view the last translation result.

Figure 5:
FIG. 5 is a third schematic diagram showing a translation interface according to an embodiment of the present disclosure.
Figure 5:
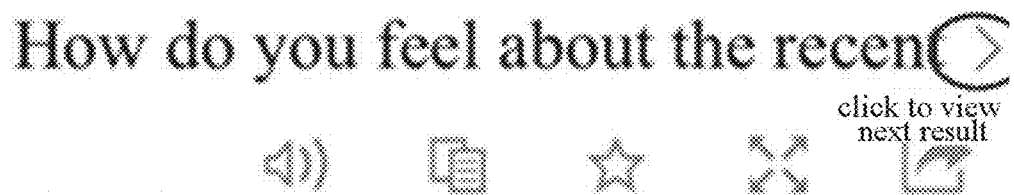
Figure 5:
Figure 5:
Figure 5:
Figure 5:
Figure 5:
Figure 5:
Figure 5:

Further, embodiments of the present disclosure may be not only applied in a personal computer, but also applied in a terminal with a small screen such as a mobile phone. The translation interface displayed on the mobile phone may be shown in FIG. 5. It should be noted that, FIG. 5 merely shows an example. Generally, the translation interface displayed on the mobile phone may be provided with the button "view the next translation result", as well as the button "view the last translation result".

With the method for providing translation information according to embodiments of the present disclosure, by displaying the acquired current target language statement and the preset control on the current interface and acquiring another target language statement according to the operation performed on the preset control from the user, and displaying the other target language statement on the current interface, many translation results of one complete statement may be provided fast and conveniently without repeatedly selecting words or phrases from several candidate items, such that the user may view more translation results, thus effectively improving the accuracy of translation and the user satisfaction level. Further, embodiments may be applied in a terminal with a small screen, such as the mobile phone, thereby having a high practicability.

Figure 6:
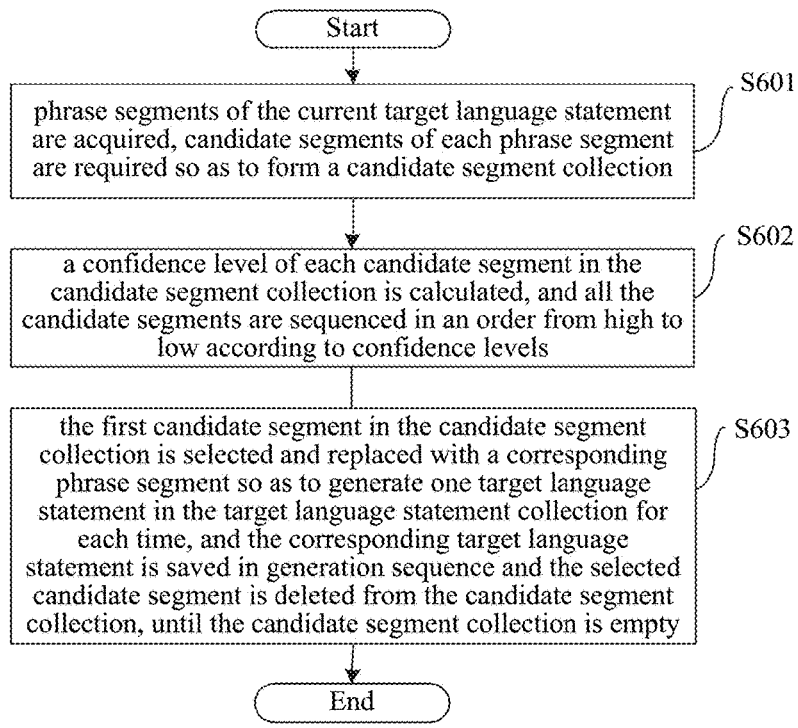
FIG. 6 is a flow chart showing a method for acquiring a target language statement collection according to an embodiment of the present disclosure.

FIG. 6 is a flow chart showing a method for acquiring a target language statement collection according to an embodiment of the present disclosure.

As shown in FIG. 6, the method for acquiring the target language statement collection associated with the current target language statement may include the followings.

In S601, phrase segments of the current target language statement are acquired, and candidate segments of each phrase segment are required so as to form a candidate segment collection.

It should be noted that, in the popular translation system (such as Google Translation System, Baidu Translation System) based on statistic, once the translation system generates the translation text, the method of partitioning phrases of the translation text is determined.

For example, for the current target language statement S "How do you feel about the recent", the Baidu Translation System provides phrase segments $S_1$ as follows: ($S_1$: How do), ($S_2$: you feel about), ($S_3$: the recent). And the phrase segments and the candidate segments corresponding respectively thereto may be shown in Table 1.

TABLE 1 phrase segments and candidate segments corresponding respectively thereto

| $S_1$: How do | $S_2$: you feel about | $S_3$: the recent |
| $S_{11}$: How do | $S_{21}$: you feel about | $S_{31}$: the recent |
| $S_{12}$: What do | $S_{22}$: you feel | $S_{32}$: recently |
| | $S_{23}$: you like | $S_{33}$: recent |

Where, $S_{ij}$ represents the $j^{th}$ candidate segment of the $i^{th}$ phrase segment. Since $S_{11}$ is same with $S_1$, $S_{21}$ is same with $S_2$, and $S_{31}$ is the same with $S_3$, the current candidate segment collection only includes $S_{12}$, $S_{22}$, $S_{23}$, $S_{32}$, and $S_{33}$.

In S602, a confidence level of each candidate segment in the candidate segment collection is calculated, and all the candidate segments are sequenced in an order from high to low according to confidence levels.

In this embodiment, the confidence level of each candidate segment may be calculated using a formula for calculating confidence level. The formula for calculating confidence level is expressed by:

$$\text{Score}(S_{ij}, S) = \exp\left(\sum_k \lambda_k F_k(S_{ij}, S)\right)$$

Where, S represents the current target language statement, $S_{ij}$ represents the $j^{th}$ candidate segment of the $i^{th}$ phrase segment, $F_k$ and $\lambda_k$ represent the $k^{th}$ characteristic and the weight thereof respectively, in which k is a positive integer.

Specifically, two types of characteristics may be used, i.e., translation model characteristic and language model characteristic. The translation model is configured for describing the translation degree between a source language statement and a target language statement (or between a certain phrase segment in the source language statement and a certain phrase segment in the current target language statement). The language model is configured for describing the fluency of the translation result. It should be noted that, the translation model characteristic and language model characteristic herein are merely exemplary.

Assume that $F_1$ and $\lambda_1$ represents the translation model characteristic and the weight thereof respectively, $F_2$ and $\lambda_2$ represents the language model characteristic and the weight thereof respectively, then the original formula may be expressed by:

$$\text{Score}(S_{ij}, S) = \exp[\lambda_1 F_1(S_{ij}, S) + \lambda_2 F_2(S_{ij}, S)]$$

Where, $\lambda_1$ and $\lambda_2$ represents weights of characteristics that may be regulated dynamically. Generally, the value range of which may be (−10. 0, 10. 0).

The translation model characteristic may be calculated using a formula of $$F(S_{ij}, S) = T(S) - T(S_i) + T(S_{ij})$$

Where, T(S) represents a total score of the translation model for translating the source language statement inputted by the user into the current target language statement S, $T(S_i)$ represents a score of the translation model for generating the segment $S_i$ from the source language statement inputted by the user, and $T(S_{ij})$ represents a score of the translation model for generating the segment $S_{ij}$ from the source language statement inputted by the user.

The language model characteristic may be calculated using a formula of $$F_2(S_{ij}, S) = L(S) - L(S_i) + L(S_{ij})$$

Where, L(S) represents a total score of the language model of the current target language statement S, $L(S_i)$ represents a score of the language model of the segment $S_i$, and $L(S_{ij})$ represents a score of the language model of the segment $S_{ij}$.

Concerning the specific methods for calculating the translation model and the language model, reference may be made to section 5.2.5 on page 91 and section 7.1 on page 121 of "Statistical machine translation" written by Philipp Koehn and translated by Chengqing Zong and Xiaojun Zhang, published by Electronic Industry Press, at September, 2012, ISBN: 9787121175923.

After the formula for calculating confidence level is determined, the scores of $S_{ij}$, $S_{22}$, $S_{23}$, $S_{32}$, and $S_{33}$ may be calculated by using the formula for calculating confidence level. Assume that $\lambda_1$ and $\lambda_2$ are equal to 0.8 and 0.2 respectively, $S_{12}$, $S_{22}$, $S_{23}$, $S_{32}$, and $S_{33}$ may be sequenced in an order from high to low after the scores are calculated, for example an order from high to low according to the calculated scores (i.e., confidence levels) may be $S_{32}$, $S_{12}$, $S_{22}$, $S_{23}$, . . . .

In S603, the first candidate segment in the candidate segment collection is selected and a corresponding phrase segment is replaced with the first candidate segment so as to generate one target language statement in the target language statement collection for each time, and the corresponding target language statement is saved in generation sequence and the selected candidate segment is deleted from the candidate segment collection, until the candidate segment collection is empty.

Figure 7:
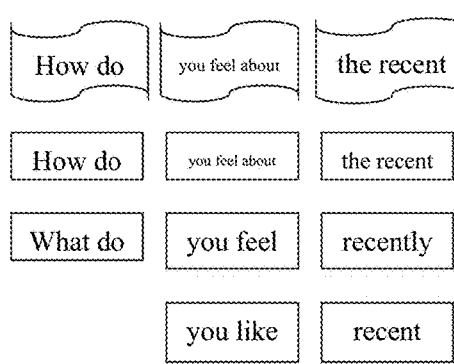
FIG. 7 is a schematic diagram of a target language statement collection acquired by adopting the method shown in FIG. 6.
Figure 7:
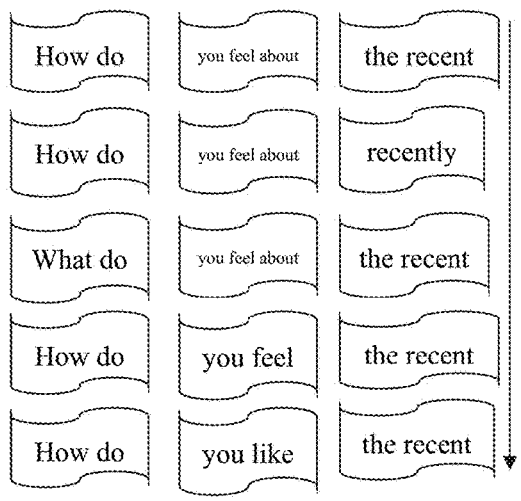

Since the first candidate segment in the candidate segment collection is $S_{32}$, $S_3$ is replaced with $S_{32}$ and the generated target language statement is saved in generation sequence, then $S_{32}$ is deleted from the candidate segment collection. The above operations are repeated, i.e., $S_1$ is replaced with $S_{12}$ and the generated target language statement is saved in generation sequence, and then $S_2$ is replaced with $S_{22}$ and the generated target language statement is saved in generation sequence, and then $S_2$ is replaced with $S_{23}$ and the generated target language statement is saved in generation sequence, and so on. Finally, the target language statements stored in the target language statement collection may be shown in FIG. 7, in which the statement with higher confidence level is in the front, following by the statement with lower confidence level.

It should be noted that, in this embodiment, the reason for only replacing one phrase segment once is to reduce the search space and to avoid the translation error (when replacing several phrase segments at the same time, the meaning of the translation statement may be deviated from the statement inputted by the user seriously). Certainly, it should be understood by those skilled in the related art, the above replace method is only exemplary, and several phrase segments may be replaced as needed.

Therefore, in this embodiment, the statements may be sequenced by automatically calculating the confidence levels, and the user needs not to select independently. The generated statements may be hided in the background, and when the user triggers the first button or the second button, the corresponding target language statement may be acquired from the background and displayed in the foreground, such that the condition to provide many translation results for a complete statement fast and conveniently may be created, and the user may view more translation results, thus effectively improving the accuracy of translation and the user satisfaction level.

In order to implement the above embodiments, the present disclosure further provides a system for providing translation information.

Figure 8:
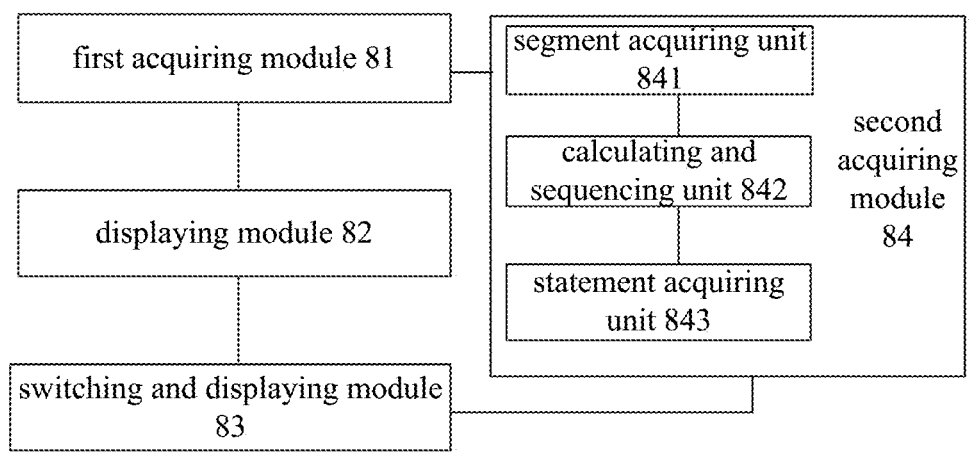
FIG. 8 is a block diagram of a system for providing translation information according to an embodiment of the present disclosure.

FIG. 8 is a block diagram of a system for providing translation information according to an embodiment of the present disclosure.

As shown in FIG. 8, the system for providing translation information includes a first acquiring module 81, a displaying module 82 and a switching and displaying module 83.

The first acquiring module 81 is configured to receive a source language statement inputted by a user, and to acquire a current target language statement according to the source language statement; the displaying module 82 is configured to display the current target language statement and a preset control on a current interface; and the switching and displaying module 83 is configured to receive an operation performed on the preset control from the user, to acquire another target language statement according to the operation and to display the other target language statement on the current interface.

In this embodiment, the first acquiring module 81 may receive the source language statement inputted by the user on the translation interface, and acquire the corresponding target language statement according to the source language statement inputted by the user. In order to distinguish from other target language statements, the target language statement acquired here may refer to "the current target language statement".

For example, the source language statement may be "你最近感觉怎么样". The current target language statement may be "How do you feel about the recent".

In addition, the system may further include a second acquiring module 84. The second acquiring module 84 is configured to acquire a target language statement collection associated with the current target language statement, in which the target language statement collection includes target language statements sequenced in an order from high to low according to confidence levels. Specifically, the second acquiring module 84 includes a segment acquiring unit 841, a calculating and sequencing unit 842, and a statement acquiring unit 843. The segment acquiring unit 841 is configured to acquire phrase segments of the current target language statement, and to acquire candidate segments of each phrase segment so as to form a candidate segment collection; the calculating and sequencing unit 842 is configured to calculate a confidence level for each candidate segment in the candidate segment collection, and to sequence all the candidate segments in an order from high to low according to confidence levels; and the statement acquiring unit 843 is configured to select a first candidate segment in the candidate segment collection, to replace a corresponding phrase segment with the first candidate segment so as to generate one target language statement in the target language statement collection for each time, to save the corresponding target language statement in generation sequence, and to delete the selected candidate segment from the candidate segment collection until the candidate segment collection is an empty collection.

Specifically, the calculating and sequencing unit 842 is configured to calculate the confidence level for each candidate segment by using the formula for calculating confidence level. Concerning the formula for calculating confidence level and the specific realization process, reference may be made to the embodiment shown in FIG. 6, which is not described herein. It can be seen from FIG. 7 that, the target language statement collection associated with the current target language statement "How do you feel about the recent", which is acquired by the second acquiring module 84, has the target language statements, such as "How do you feel about recently", "What do you feel about the recent", "How do you feel the recent", "How do you like the recent" or other target language statements stored therein, and confidence levels of these target language statements are sequenced in an order from high to low.

In this embodiment, after the first acquiring module 81 acquires the current target language statement, the displaying module 82 may display the current target language statement on the corresponding translation interface. Additionally, except the current target language statement, the preset control may be displayed on the translation interface. The preset control includes but is not limited to a button.

Specifically, the preset control may include a first button and a second button. The first button may be configured to view the next translation result, i.e., view the next target language statement. The second button is configured to view the last translation result, i.e., view the last target language statement.

In addition, in order to facilitate to distinguish functions of the two buttons, the buttons may be indicated by preset icons. For example, the button "view the next translation result" may be indicated by ">", and the button "view the last translation result" may be indicated by "<".

If the preset control includes the first button and the second button, the switching and displaying module 83 is further configured to: receive a trigger operation performed on the first button from the user and acquire a next target language statement from the target language statement collection according to the trigger operation and the current target language statement displayed on the current interface; or, receive a trigger operation performed on the second button from the user and acquire a last target language statement from the target language statement collection according to the trigger operation and the current target language statement displayed on the current interface.

For example, the first button, i.e., the button "view the next translation result" is displayed on the translation interface shown in FIG. 3, and the user may view more translation results after clicking this button. Additionally, as shown in FIG. 4, the second button, i.e., the button "view the last translation result" may be displayed on the translation interface, and the user may click this button and return to view the last translation result.

Further, embodiments of the present disclosure may be not only applied in a personal computer, but also applied in a terminal with a small screen such as a mobile phone. The translation interface displayed on the mobile phone may be shown in FIG. 5. It should be noted that, FIG. 5 merely shows an example. Generally, the translation interface displayed on the mobile phone may be provided with the button "view the next translation result", as well as the button "view the last translation result".

With the system for providing translation information according to embodiments of the present disclosure, by displaying the acquired current target language statement and the preset control on the current interface through the displaying module, and by acquiring through the switching and displaying module another target language statement according to the operation performed on the preset control from the user and displaying the other target language statement on the current interface, many translation results of one complete statement may be provided fast and conveniently without repeatedly selecting words or phrases from several candidate items, such that the user may view more translation results, thus effectively improving the accuracy of translation and the user satisfaction level. Further, embodiments may be applied in a terminal with a small screen, such as the mobile phone, thereby having a high practicability.

In order to implement the above embodiments, the present disclosure further provides a storage medium for storing an application program which is configured to execute the method for providing translation information according to any of embodiments of the present disclosure.

In order to implement the above embodiments, the present disclosure further provides a device for providing translation information which includes one or more processors, memory, and one or more modules. The one or more modules are stored in the memory, when executed by the one or more processors, the following operations are performed.

In S1', a source language statement inputted by a user is received, and a current target language statement is acquired according to the source language statement.

In S2', the current target language statement and a preset control are displayed on a current interface.

In S3', an operation performed on the preset control is received from the user, another target language statement is acquired according to the operation and the other target language statement is displayed on the current interface.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, in a case without contradictions, different embodiments or examples or features of different embodiments or examples may be combined by those skilled in the art.

Additionally, those skilled in the art shall understand that terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. And the scope of a preferred embodiment of the present disclosure includes other implementations in which the order of execution may differ from that which is depicted in the flow chart, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that the various parts of the present disclosure may be realized by hardware, software, firmware or combinations thereof. In the above embodiments, a plurality of steps or methods may be stored in a memory and achieved by software or firmware executed by a suitable instruction executing system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable memory medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable memory medium.

The above-mentioned memory medium may be a read-only memory, a magnetic disc, an optical disc, etc. Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. A computer-implemented method for providing translation information, comprising:

receiving, at one or more computing devices, a source language sentence inputted by a user;

acquiring, at the one or more computing devices, a current target language sentence according to the source language sentence;

displaying, at the one or more computing devices, the current target language sentence and a preset control on a current interface;

acquiring, at the one or more computing devices, a target language sentence collection associated with the current target language sentence, wherein the target language sentence collection comprises target language sentences sequenced in an order from high to low according to confidence levels;

receiving, at the one or more computing devices, an operation performed on the preset control from the user;

acquiring, at the one or more computing devices, another target language sentence according to the operation from the target language sentence collection;

displaying, at the one or more computing devices, the other target language sentence on the current interface, wherein, acquiring the target language sentence collection comprises:

acquiring, at the one or more computing devices, phrase segments of the current target language sentence;

acquiring, at the one or more computing devices, candidate segments of each phrase segment to form a candidate segment collection;

calculating, at the one or more computing devices, a confidence level of each candidate segment in the candidate segment collection;

sequencing, at the one or more computing devices, all the candidate segments in an order from high to low according to confidence levels; and performing, at the one or more computing devices, the following iterations:

selecting a first candidate segment in the candidate segment collection;

replacing a corresponding phrase segment in the current target language sentence with the first candidate segment to generate one target language sentence in the target language sentence collection;

saving the one target language sentence in generation sequence;

deleting the selected first candidate segment from the candidate segment collection; and returning the selecting the first candidate segment in the candidate segment collection until the candidate segment collection is an empty collection.

2. The method according to claim 1, wherein the preset control comprises a first button and a second button.

3. The method according to claim 2, wherein, receiving, at the one or more computing devices, an operation performed on the preset control from the user, and acquiring, at the one or more computing devices, another target language sentence according to the operation comprises:

receiving, at the one or more computing devices, a trigger operation performed on the first button from the user, and acquiring, at the one or more computing devices, a next target language sentence from the target language sentence collection according to the trigger operation and the current target language sentence displayed on the current interface; or receiving, at the one or more computing devices, a trigger operation performed on the second button from the user, and acquiring, at the one or more computing devices, a last target language sentence from the target language sentence collection according to the trigger operation and the current target language sentence displayed on the current interface.

4. A non-transitory computer storage medium having stored therein instructions that, when executed by a processor of a device, causes the device to perform the method for providing translation information, the method comprising:

receiving a source language sentence inputted by a user;

acquiring a current target language sentence according to the source language sentence;

displaying the current target language sentence and a preset control on a current interface;

acquiring a target language sentence collection associated with the current target language sentence, wherein the target language sentence collection comprises target language sentences sequenced in an order from high to low according to confidence levels;

receiving an operation performed on the preset control from the user;

acquiring another target language sentence according to the operation; and displaying the other target language sentence on the current interface, wherein, acquiring the target language sentence collection comprises:

acquiring phrase segments of the current target language sentence;

acquiring candidate segments of each phrase segment to form a candidate segment collection;

calculating a confidence level of each candidate segment in the candidate segment collection;

sequencing all the candidate segments in an order from high to low according to confidence levels; and performing the following iterations:

selecting a first candidate segment in the candidate segment collection;

replacing a corresponding phrase segment in the current target language sentence with the first candidate segment to generate one target language sentence in the target language sentence collection;

saving the one target language sentence in generation sequence;

deleting the selected first candidate segment from the candidate segment collection; and returning the selecting the first candidate segment in the candidate segment collection until the candidate segment collection is an empty collection.

5. The non-transitory computer storage medium according to claim 4, wherein the preset control comprises a first button and a second button.

6. The non-transitory computer storage medium according to claim 5, wherein, receiving an operation performed on the preset control from the user, and acquiring another target language sentence according to the operation comprises:

receiving a trigger operation performed on the first button from the user, and acquiring a next target language sentence from the target language sentence collection according to the trigger operation and the current target language sentence displayed on the current interface; or receiving a trigger operation performed on the second button from the user, and acquiring a last target language sentence from the target language sentence collection according to the trigger operation and the current target language sentence displayed on the current interface.

7. A device for providing translation information, comprising:
one or more processors;
a memory; and
one or more modules, stored in the memory, when executed by the one or more processors, performing:
receiving a source language sentence inputted by a user;
acquiring a current target language sentence according to the source language sentence;
displaying the current target language sentence and a preset control on a current interface;
acquiring a target language sentence collection associated with the current target language sentence, wherein the target language sentence collection comprises target language sentences sequenced in an order from high to low according to confidence levels;
receiving an operation performed on the preset control from the user;
acquiring another target language sentence according to the operation; and
displaying the other target language sentence on the current interface,
wherein, acquiring the target language sentence collection comprises:
acquiring, at the one or more computing devices, phrase segments of the current target language sentence;
acquiring, at the one or more computing devices, candidate segments of each phrase segment to form a candidate segment collection;
calculating, at the one or more computing devices, a confidence level of each candidate segment in the candidate segment collection;
sequencing, at the one or more computing devices, all the candidate segments in an order from high to low according to confidence levels; and
performing, at the one or more computing devices, the following iterations:
selecting a first candidate segment in the candidate segment collection;
replacing a corresponding phrase segment in the current target language sentence with the first candidate segment to generate one target language sentence in the target language sentence collection;
saving the one target language sentence in generation sequence;
deleting the selected first candidate segment from the candidate segment collection; and
returning the selecting the first candidate segment in the candidate segment collection until the candidate segment collection is an empty collection.

8. The device according to claim 7, wherein the preset control comprises a first button and a second button.

9. The device according to claim 8, wherein, receiving an operation performed on the preset control from the user, and acquiring another target language sentence according to the operation comprises:
receiving a trigger operation performed on the first button from the user, and acquiring a next target language sentence from the target language sentence collection according to the trigger operation and the current target language sentence displayed on the current interface; or
receiving a trigger operation performed on the second button from the user, and acquiring a last target language sentence from the target language sentence collection according to the trigger operation and the current target language sentence displayed on the current interface.

* * * * *